(12) United States Patent
Jones et al.

(10) Patent No.: US 11,104,393 B2
(45) Date of Patent: Aug. 31, 2021

(54) ATTACHABLE TRACK SHOE COVER

(71) Applicant: Caterpillar Inc., Deerfield, IL (US)

(72) Inventors: Benjamin Jones, Bartonville, IL (US); Paul Prest, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 492 days.

(21) Appl. No.: 16/043,614

(22) Filed: Jul. 24, 2018

(65) Prior Publication Data
US 2020/0031409 A1    Jan. 30, 2020

(51) Int. Cl.
| B62D 55/20 | (2006.01) |
| B62D 55/21 | (2006.01) |
| B62D 55/32 | (2006.01) |
| B62D 55/06 | (2006.01) |

(52) U.S. Cl.
CPC .......... B62D 55/202 (2013.01); B62D 55/21 (2013.01); B62D 55/32 (2013.01); B62D 55/06 (2013.01)

(58) Field of Classification Search
CPC ...... B62D 55/20; B62D 55/202; B62D 55/21; B62D 55/06; B62D 55/32
See application file for complete search history.

(56) References Cited

U.S. PATENT DOCUMENTS

| 3,955,855 A | 5/1976 | Massieon |
| 4,098,543 A | 7/1978 | Sturges |
| 4,139,240 A | 2/1979 | Profio et al. |
| 4,407,551 A | 10/1983 | Baylor |
| 5,749,635 A | 5/1998 | Umbarger |
| 6,929,335 B2 | 8/2005 | Colwell et al. |
| 9,260,144 B2 * | 2/2016 | Park ..................... B62D 55/275 |
| 9,446,805 B2 | 9/2016 | Ellmann |
| 2014/0306516 A1 | 10/2014 | Knobloch et al. |
| 2016/0194039 A1 * | 7/2016 | Fitzgibbons, Jr. ..... B62D 55/21 |
| | | 305/201 |
| 2017/0275717 A1 | 9/2017 | Saad et al. |

FOREIGN PATENT DOCUMENTS

| GB | 710821 A | 6/1954 |
| GB | 1515450 | 6/1978 |
| WO | 200029276 W | 5/2000 |
| WO | 2012154737 W | 11/2012 |

* cited by examiner

*Primary Examiner* — Jason R Bellinger
(74) *Attorney, Agent, or Firm* — Harrity & Harrity LLP

(57) ABSTRACT

A track shoe cover may include a roller engaging surface and a shoe engaging surface. The shoe engaging surface may include a shoe engaging recess defined on at least two opposite sides by a set of side walls, and a respective attachment groove included in the set of side walls. The respective attachment groove may be configured to facilitate mechanical connection of the track shoe cover and a crawler shoe.

20 Claims, 7 Drawing Sheets

ATTACHABLE TRACK SHOE COVER

TECHNICAL FIELD

The present disclosure relates generally to a track shoe cover and, more particularly, to an attachable track shoe cover.

BACKGROUND

A machine, such as a hydraulic mining shovel, may be moveable via use of a crawler track (e.g., a continuous track, a track, and/or the like). A crawler track may comprise a loop of multiple crawler shoes (e.g., track shoes) interlocked with each other via use of a pin and pin bore system. A crawler shoe may have various wear surfaces, such as a ground engaging surface that engages a traveling surface of the machine, a roller engaging surface that contacts various rollers associated with the crawler track (e.g., load rollers, carrier rollers, idlers, and/or the like), and/or the like. Typically, and with particular regard to a roller engaging surface, contact between the roller engaging surface and a set of rollers associated with the machine may cause the crawler shoe to experience significant wear on the roller engaging surface. To compensate for this wear, the materials used for the crawler shoe may be selected such that the crawler shoe has a threshold hardness, a threshold durability, and/or the like. For example, a high carbon percentage alloy is a type of material often selected for the crawler shoe because this type of material can be subjected to induction hardening to achieve a needed hardness.

While this type of material can provide a needed hardness, durability, and/or the like, this type of material, and/or the process of inductive hardening can be expensive. In addition, the entire crawler shoe may still need to be replaced when the roller engaging surface experiences a threshold amount of wear. As such, various components of a crawler shoe may be adapted based on these considerations and/or for one or more uses and/or functions by varying the design of the components.

One attempt to adapt a crawler shoe is disclosed in U.S. Pat. No. 4,139,240 that issued to Profio, et al. on Feb. 13, 1979 ("the '240 patent"). In particular, the '240 patent discloses a crawler shoe that comprises a solid main body formed of high strength tempered steel plate, integrally formed means including projections, recesses, and pin holes on the body for detachably and articulately connecting the shoe to an adjacent shoe, end gussets welded to and projecting from the lateral sides of the body, a roller path plate of moderately hard high strength steel welded to the upper surface of the main body, a pair of hollow drive lugs welded to the upper surface of the body on opposite sides of said roller path plate and formed of cast austenitic manganese steel, and a belly pan of high strength high hardness abrasion-resistant steel plate welded to the underside of the main body and the gussets. Since all materials used in the shoe are fabricated of steels which are readily weldable, and are secured together by welding during manufacturing, all worn components can be cut free and replacement components can be welded in place in the field.

While the crawler shoe of the '240 patent may include a roller path plate of moderately hard high strength steel welded to the upper surface of the main body, all materials used in the shoe are fabricated of steels and are secured together by welding during manufacturing. This limits the types of materials and/or manufacturing processes that can be used to form the crawler shoe.

The attachable track shoe cover of the present disclosure solves one or more of the problems set forth above and/or other problems in the art.

SUMMARY

In one aspect, the present disclosure is related to a track shoe cover. The track shoe cover may comprise a roller engaging surface, and a shoe engaging surface. The shoe engaging surface may comprise a shoe engaging recess defined on at least two opposite sides by a set of side walls, and a respective attachment groove included in the set of side walls. The respective attachment groove may be configured to facilitate mechanical connection of the track shoe cover and a crawler shoe.

In another aspect, the present disclosure is related to a crawler shoe. The crawler shoe may comprise a track shoe cover engaging structure on an upper surface of the crawler shoe. The track shoe cover engaging structure may be configured to mechanically connect with a shoe engaging recess of a track shoe cover. The track shoe cover engaging structure may comprise a respective attachment ridge on at least one pair of opposite sides of the track shoe cover engaging structure. The respective attachment ridge may be configured to facilitate mechanical connection of the crawler shoe and the track shoe cover.

In yet another aspect, the present disclosure is related to a system. The system may comprise a track shoe cover. The track shoe cover may comprise a shoe engaging recess configured to mechanically connect with a track shoe cover engaging structure of a crawler shoe via a set of attachment grooves associated with the shoe engaging recess. The system may comprise the crawler shoe. The crawler shoe may comprise the track shoe cover engaging structure configured to mechanically connect with the shoe engaging recess via a set of attachment ridges associated with the track shoe cover engaging structure. The set of attachment grooves and the set of attachment ridges may be configured to mechanically connect with each other to mechanically connect the track shoe cover and the crawler shoe.

DETAILED DESCRIPTION

This disclosure relates to an attachable track shoe cover. The attachable track shoe cover has universal applicability to any machine utilizing such a track shoe cover. The term "machine" may refer to any machine that performs an operation associated with an industry such as, for example, mining, construction, farming, transportation, forestry, or any other industry. As some examples, the machine may be a vehicle, a shovel (e.g., a hydraulic mining shovel, an electric rope shovel, and/or the like), a backhoe loader, a cold planer, a wheel loader, a compactor, a feller buncher, a forest machine, a forwarder, a harvester, an excavator (e.g., a hydraulic excavator), an industrial loader, a knuckleboom loader, a material handler, a motor grader, a pipelayer, a road reclaimer, a skid steer loader, a skidder, a telehandler, a tractor, a dozer, a tractor scraper, or other paving or underground mining equipment. Moreover, one or more implements may be connected to the machine.

Figure 1:
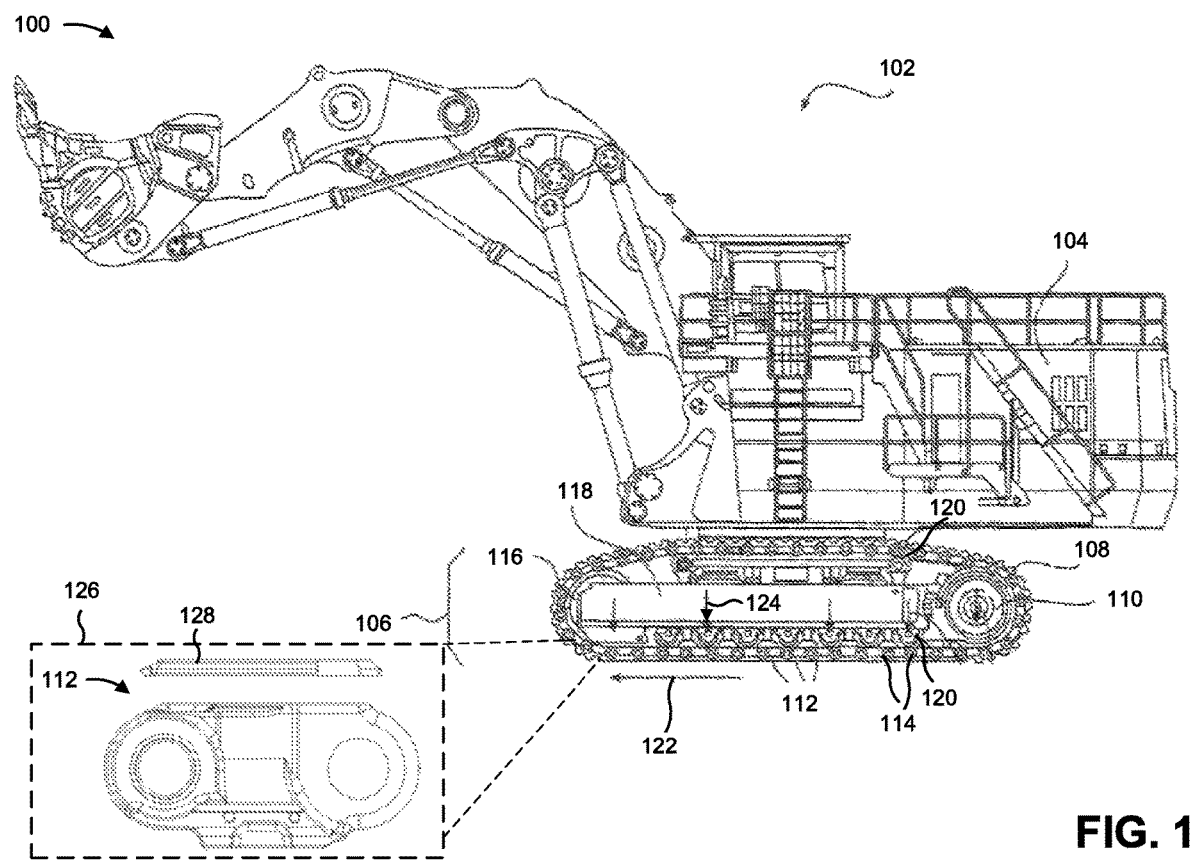
FIG. 1 is a diagram of an example machine that includes an attachable track shoe cover.

FIG. 1 is a diagram 100 of an example machine that includes an attachable track shoe cover.

FIG. 1 shows a track type machine 102. For example, machine 102 may be a shovel, such as a mining shovel, a hydraulic mining shovel, and/or the like. In some implementations, machine 102 may include an engine 104 supported by a frame and configured to drive a tracked undercarriage 106 (e.g., a crawler track, a continuous track, and/or the like).

In some implementations, tracked undercarriage 106 may include crawler tracks 108 that are located at opposing sides of machine 102 and driven by engine 104 via corresponding drive wheels 110. In some implementations, a crawler track 108 may include a plurality of crawler shoes 112 connected end-to-end via pins 114 to form an endless loop. In some implementations, the endless loop of crawler shoes 112 may be wrapped around corresponding drive wheels 110, one or more idler wheels 116, and at least one roller 120. In some implementations, drive wheels 110 may engage pins 114 (or engage bushings that encase pins 114) of crawler shoes 112 and thereby transmit torque from engine 104 to crawler track 108. In some implementations, idler wheel 116 and rollers 120 may guide crawler track 108 in a general elliptical trajectory around drive wheels 110. In some implementations, a tensioner 118 may be located between idler wheel 116 and drive wheel 110 to push these components apart and thereby maintain a desired tension of crawler track 108. In some implementations, crawler shoes 112 may function to transmit the torque from drive wheels 110 as a driving linear (tractive) force 122 into a ground surface. The weight of machine 102 may be transmitted from drive wheel 110, idler wheel 116, and rollers 120 through crawler shoes 112 as a downward bearing force 124 into the ground surface.

As shown by reference number 126, machine 102 may include track shoe cover 128 associated with a roller path wear surface of a crawler shoe 112, as described elsewhere herein. For example, although shown as being physically separated, track shoe cover 128 may be mechanically connected to the roller path wear surface of crawler shoe 112 to protect the roller path wear surface from wear during operation of machine 102.

As indicated above, FIG. 1 is provided as an example. Other examples are possible and may differ from what was described in connection with FIG. 1.

Figure 2:
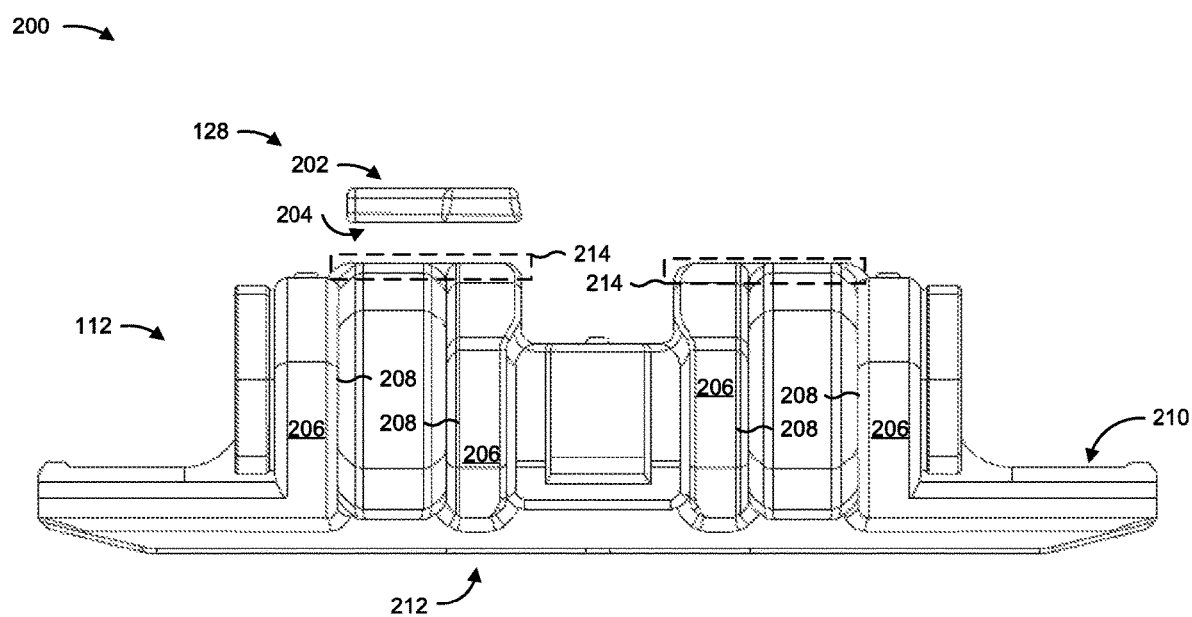
FIG. 2 is a diagram of an example track shoe cover and crawler shoe of the machine of FIG. 1.

FIG. 2 is a diagram 200 of an example track shoe cover and crawler shoe of the machine of FIG. 1. For example, FIG. 2 shows a front or rear view of crawler shoe 112 and track shoe cover 128. Although FIG. 2 shows crawler shoe 112 and track shoe cover 128 as being physically separated, crawler shoe 112 and track shoe cover 128 may be mechanically connected to each other when installed on machine 102, as described in more detail elsewhere herein.

As shown in FIG. 2, track shoe cover 128 may include a roller engaging surface 202. For example, roller engaging surface 202 may be a generally flat surface. In some implementations, when track shoe cover 128 is installed on crawler shoe 112 and crawler shoe 112 is installed on crawler track 108, various rollers of machine 102 (e.g., drive wheels 110, idler wheels 116, rollers 120, and/or the like) may contact roller engaging surface 202 rather than an upper surface of crawler shoe 112.

As further shown in FIG. 2, track shoe cover 128 may include a shoe engaging surface 204. For example, shoe engaging surface 204 may engage a portion of crawler shoe 112 to mechanically connect crawler shoe 112 and track shoe cover 128 to each other via various respective attachment structures of crawler shoe 112 and track shoe cover 128.

As further shown in FIG. 2, crawler shoe 112 may include various links 206. For example, the various links 206 may be spaced apart from each other in a pattern to facilitate interlocking with one or more other crawler shoes 112, such as when included in crawler track 108. In some implementations, a link 206 may include a pin bore 208. For example, pin bore 208 may facilitate installation of a pin through one or more links 206. In some implementations, a pin may be installed through pin bores 208 of multiple crawler shoes 112 to mechanically connect the multiple crawler shoes 112, such as to form a crawler track 108.

As further shown in FIG. 2, crawler shoe 112 may include a ground engaging pad 210. In some implementations, a portion of ground engaging pad 210 may engage a traveling surface of machine 102, may provide machine 102 with traction, and/or the like. For example, ground engaging surface 212 of ground engaging pad 210 may perform these functions.

As further shown in FIG. 2, crawler shoe 112 may include a set of track shoe cover engaging structures 214. For example, a track shoe cover engaging structure 214 may include a portion of one or more links 206 of crawler shoe 112 that is configured to mechanically connect with track shoe cover 128. Continuing with the previous example, track shoe cover engaging structure 214 may include an attachment structure to mechanically connect crawler shoe 112 to track shoe cover 128. In some implementations, track shoe cover engaging structure 214 may be formed (e.g., through casting and/or machining) into a shape that matches track shoe cover 128 (e.g., that matches a shoe engaging recess (described elsewhere herein) of track shoe cover 128).

In some implementations, track shoe cover 128 and crawler shoe 112 (or various components thereof) may be formed from different materials. For example, track shoe cover 128 may be formed from a material that is harder relative to a material from which crawler shoe 112 is formed, a material that has increased wear resistance relative to a material from which crawler shoe 112 is formed (e.g., track shoe cover 128 and crawler shoe 112 may be formed from materials that have different wear characteristics), and/or the like. Continuing with the previous example, track shoe cover 128 and crawler shoe 112 may be formed from different steel alloys (e.g., track shoe cover 128 may be formed from a harder steel alloy relative to crawler shoe 112), track shoe cover 128 may be formed from a high carbon percent alloy (e.g., which can be inductively hardened) and crawler shoe 112 may be formed from a softer and/or cheaper steel alloy, and/or the like.

In some implementations, track shoe cover 128 may be formed from a material that has a hardness of at least approximately 45 on a Rockwell scale. For example, track shoe cover 128 may be formed from a material that has a hardness in a range from approximately 50 to approximately 55 on a Rockwell scale. In some implementations, track shoe cover 128 may have a particular hardness after one or more treatment processes, such as a heat treatment process, a cold treatment process, a shock hardening process, and/or the like.

In some implementations, uses of track shoe cover 128 described herein may impact material selection for crawler shoe 112 and/or track shoe cover 128. For example, crawler shoe 112 and track shoe cover 128 may be mechanically connected using various respective attachment structures of crawler shoe 112 and track shoe cover 128 by application of mechanical pressure to track shoe cover 128 (e.g., to roller engaging surface 202) and to crawler shoe 112 (e.g., to ground engaging surface 212), such as press-fit compression. As such, materials selected for crawler shoe 112 and/or track shoe cover 128 (or the various respective attachment structures of crawler shoe 112 and/or track shoe cover 128) may need to allow flexibility for application of such mechanical pressure and/or such mechanical connection without shearing the various attachment structures, cracking, otherwise deforming crawler shoe 112 and/or track shoe cover 128, and/or the like.

In some implementations, crawler shoe 112 and track shoe cover 128 may be mechanically connected via heating and/or freezing of one or more of crawler shoe 112 and track shoe cover 128 (e.g., heating track shoe cover 128 to expand track shoe cover 128, placing track shoe cover 128 on crawler shoe 112, and freezing track shoe cover 128 to shrink track shoe cover 128). Additionally, or alternatively, crawler shoe 112 and track shoe cover 128 may be mechanically connected via use of attachment structures that facilitate sliding of track shoe cover 128 onto track shoe cover engaging structure 214 (e.g., and secured using a fastener, such as a bolt or a screw). For example, track shoe cover engaging structure 214 may include ridges that can mechanically mate with track shoe cover 128 via a sliding motion of track shoe cover 128 (e.g., track shoe cover 128 may have at least one open end that facilitates sliding of track shoe cover 128 onto track shoe cover engaging structure 214).

Additionally, or alternatively, track shoe cover 128 can be mechanically connected to track shoe cover engaging structure 214 via use of a fastener. In some implementations, the fastener may be located within a bore through roller engaging surface 202 and shoe engaging surface 204. In some implementations, the bore may be configured such that a depth of the bore due to wear of track shoe cover 128 may indicate an amount of time remaining before track shoe cover 128 needs to be replaced, a percentage of track shoe cover 128 that has been worn, and/or the like. Additionally, or alternatively, crawler shoe 112 and track shoe cover 128 may be mechanically connected via welding, melting, and/or the like.

As indicated above, FIG. 2 is provided as an example. Other examples are possible and may differ from what was described in connection with FIG. 2.

Figure 3:
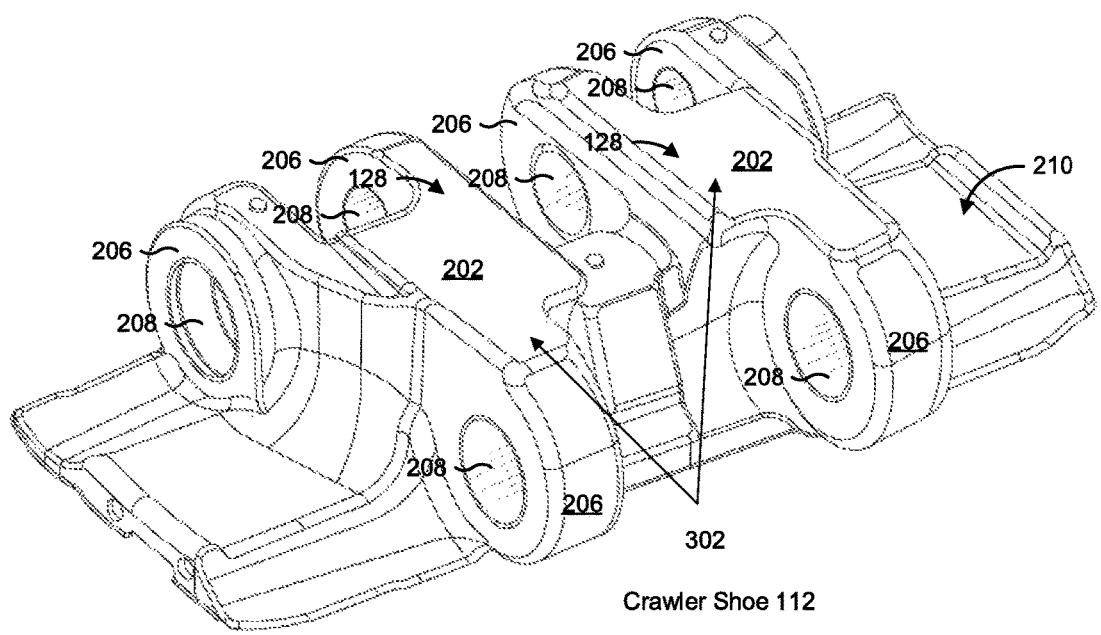
FIG. 3 is a diagram of an example track shoe cover and crawler shoe of the machine of FIG. 1.

FIG. 3 is a diagram 300 of an example track shoe cover and crawler shoe of the machine of FIG. 1. For example, FIG. 3 shows a perspective top view of crawler shoe 112 with multiple track shoe covers 128 connected to crawler shoe 112.

As shown by reference number 302, multiple track shoe covers 128 may be mechanically connected to respective track shoe cover engaging structures 214 (reference number not shown). For example, the multiple track shoe covers 128 may be mechanically connected such that a respective roller engaging surface 202 of the multiple track shoe covers 128 is exposed for contact with various rollers of machine 102.

As indicated above, FIG. 3 is provided as an example. Other examples are possible and may differ from what was described in connection with FIG. 3.

Figure 4:
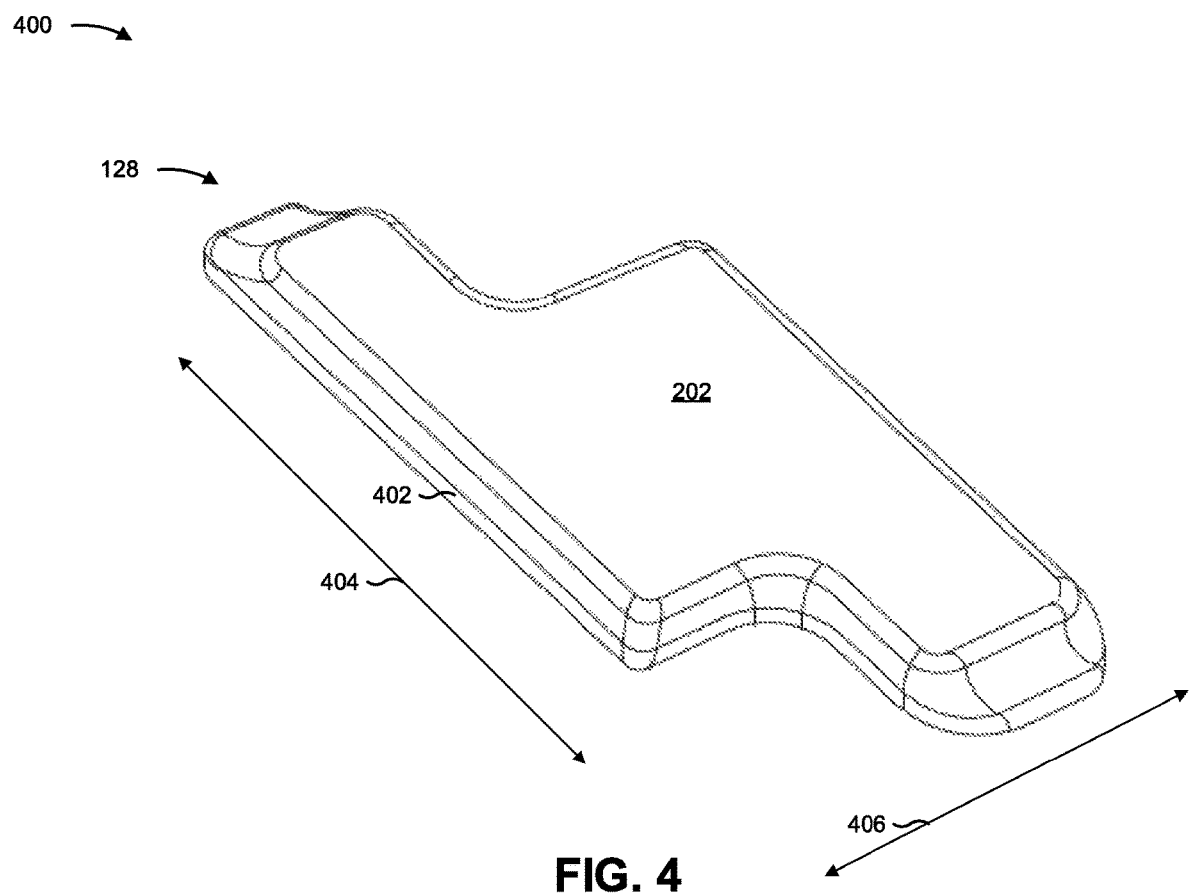
FIG. 4 is a diagram of an example track shoe cover of the machine of FIG. 1.

FIG. 4 is a diagram 400 of an example track shoe cover of the machine of FIG. 1. For example, FIG. 4 shows a perspective top view of track shoe cover 128.

As shown in FIG. 4, track shoe cover 128 may include a set of side walls 402. For example, the set of side walls 402 may define a shoe engaging recess (not shown) on shoe engaging surface 204 of track shoe cover 128. In some implementations, and as shown in FIG. 4, the set of side walls 402 may include a generally continuous side wall 402 around the entire structure of track shoe cover 128. Conversely, in some implementations, the set of side walls 402 may include multiple discontinuous side walls 402 (the set of side walls 402 may not be formed entirely around the structure of track shoe cover 128).

In some implementations, the set of side walls 402 may be machined from track shoe cover 128 (e.g., material may be removed from track shoe cover 128 after forming of track shoe cover 128 to form the set of side walls 402). Conversely, in some implementations, the set of side walls 402 may be formed separate from other components of track shoe cover 128 and may be attached to track shoe cover 128 via welding, use of a fastener (e.g., a bolt, a rivet, and/or the like), and/or the like.

In some implementations, and as shown by reference number 404, the set of side walls 402 may include a subset of side walls 402 and/or portions of a side wall 402 that extend in a generally longitudinal direction. Additionally, or alternatively, and as shown by reference number 406, the set of side walls 402 may include a subset of side walls 402 and/or portions of side wall 402 that extend in a generally lateral direction. In some implementations, the set of side walls 402 may include a subset of side walls 402 and/or transitional portions that connect and/or provide a transition between longitudinally extending side walls 402 and laterally extending side walls 402.

In some implementations, track shoe cover 128 may need to include a set of side walls 402 on at least two opposite sides of track shoe cover 128 (e.g., on at least two longitudinally extending side walls 402 and/or on at least two laterally extending side walls 402). For example, this configuration may facilitate mechanical connection of crawler shoe 112 and track shoe cover 128 to each other in the manner described herein via mechanical pressure from the side walls 402 without additional use of welding, fasteners, and/or the like.

As indicated above, FIG. 4 is provided as an example. Other examples are possible and may differ from what was described in connection with FIG. 4.

Figure 5:
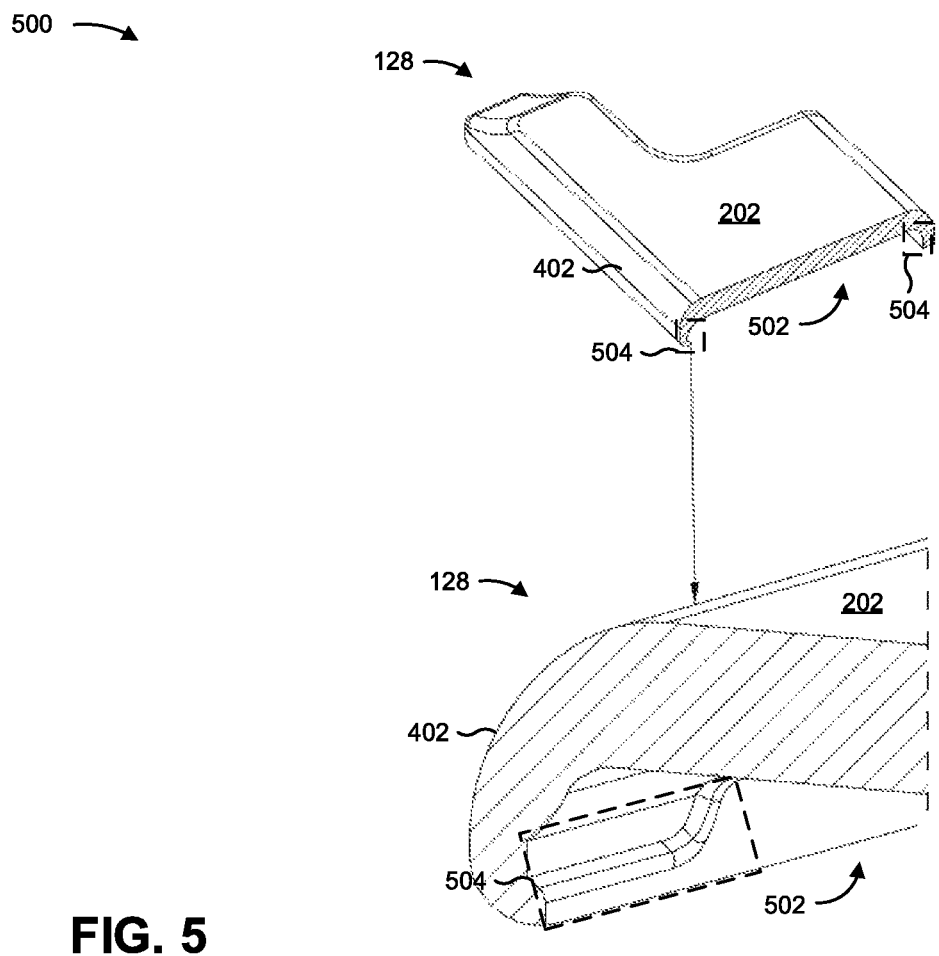
FIG. 5 is a diagram of an example track shoe cover of the machine of FIG. 1.

FIG. 5 is a diagram 500 of an example track shoe cover of the machine of FIG. 1. For example, FIG. 5 shows various cross-sectional views of track shoe cover 128.

As shown in FIG. 5, track shoe cover 128 may include a shoe engaging recess 502. For example, and as shown in FIG. 5, shoe engaging recess 502 may be defined by a set of side walls 402. In some implementations, a shape of shoe engaging recess 502 may match track shoe cover engaging structure 214, may be such that a mechanical connection can be formed between crawler shoe 112 and track shoe cover 128 via mechanical mating of track shoe cover engaging structure 214 and shoe engaging recess 502, and/or the like.

As further shown in FIG. 5, track shoe cover 128 may include a set of attachment grooves 504. For example, the set of attachment grooves 504 may be attachment structures that facilitate mechanical connection of track shoe cover 128 and crawler shoe 112 to each other. Continuing with the previous example, the set of attachment grooves 504 may be configured to mechanically connect with a set of attachment ridges, described elsewhere herein, of crawler shoe 112 (e.g., of track shoe cover engaging structure 214). In some implementations, the set of attachment grooves 504 may be machined from the set of side walls 402, may be formed via welding and/or fastening of plates to track shoe cover 128, and/or the like.

As indicated above, FIG. 5 is provided as an example. Other examples are possible and may differ from what was described in connection with FIG. 5.

Figure 6:
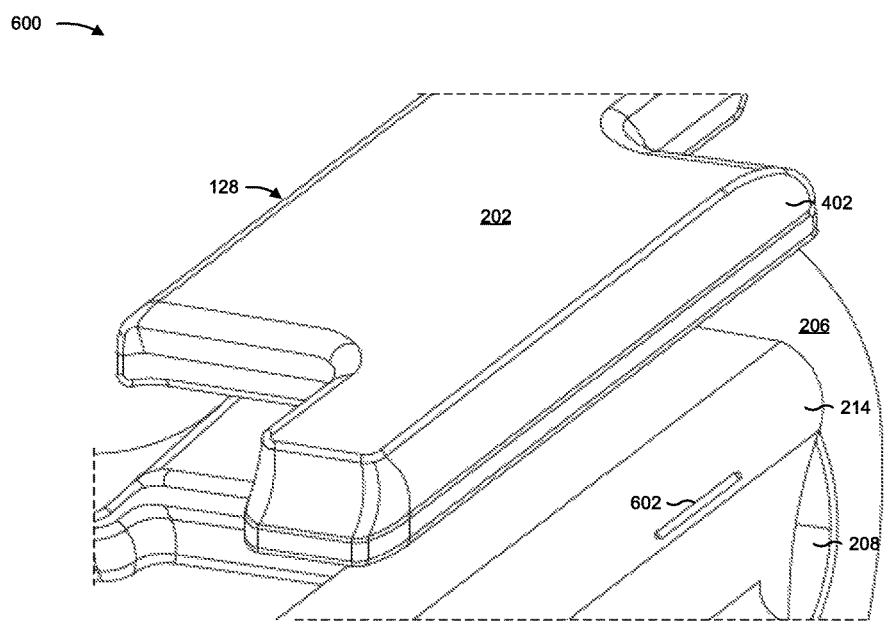
FIG. 6 is a diagram of an example track shoe cover and crawler shoe of the machine of FIG. 1.

FIG. 6 is a diagram 600 of an example track shoe cover and crawler shoe of the machine of FIG. 1. FIG. 6 shows an alignment of track shoe cover 128 and/or various components of crawler shoe 112.

As shown in FIG. 6, crawler shoe 112 may include a set of attachment ridges 602. For example, track shoe cover engaging structure 214 of crawler shoe 112 may include a set of attachment ridges 602 as attachment structures. In some implementations, an attachment ridge 602 may include raised material that can mechanically connect with an attachment groove 504. In some implementations, the set of attachment ridges 602 may be positioned on track shoe cover engaging structure 214 such that the set of attachment ridges 602 is aligned with the set of attachment grooves 504 when track shoe cover 128 is mechanically connected to track shoe cover engaging structure 214.

In some implementations, track shoe cover engaging structure 214 may include a set of attachment ridges 602 on at least two opposite sides of track shoe cover engaging structure 214. This may facilitate mechanical connection of track shoe cover 128 and track shoe cover engaging structure 214 to each other without use of fasteners, welding, and/or the like. In some implementations, the set of attachment ridges 602 may be machined from track shoe cover engaging structure 214, may be welded to track shoe cover engaging structure 214, may be fastened to track shoe cover engaging structure 214, and/or the like.

As indicated above, FIG. 6 is provided as an example. Other examples are possible and may differ from what was described with regard to FIG. 6.

Figure 7:
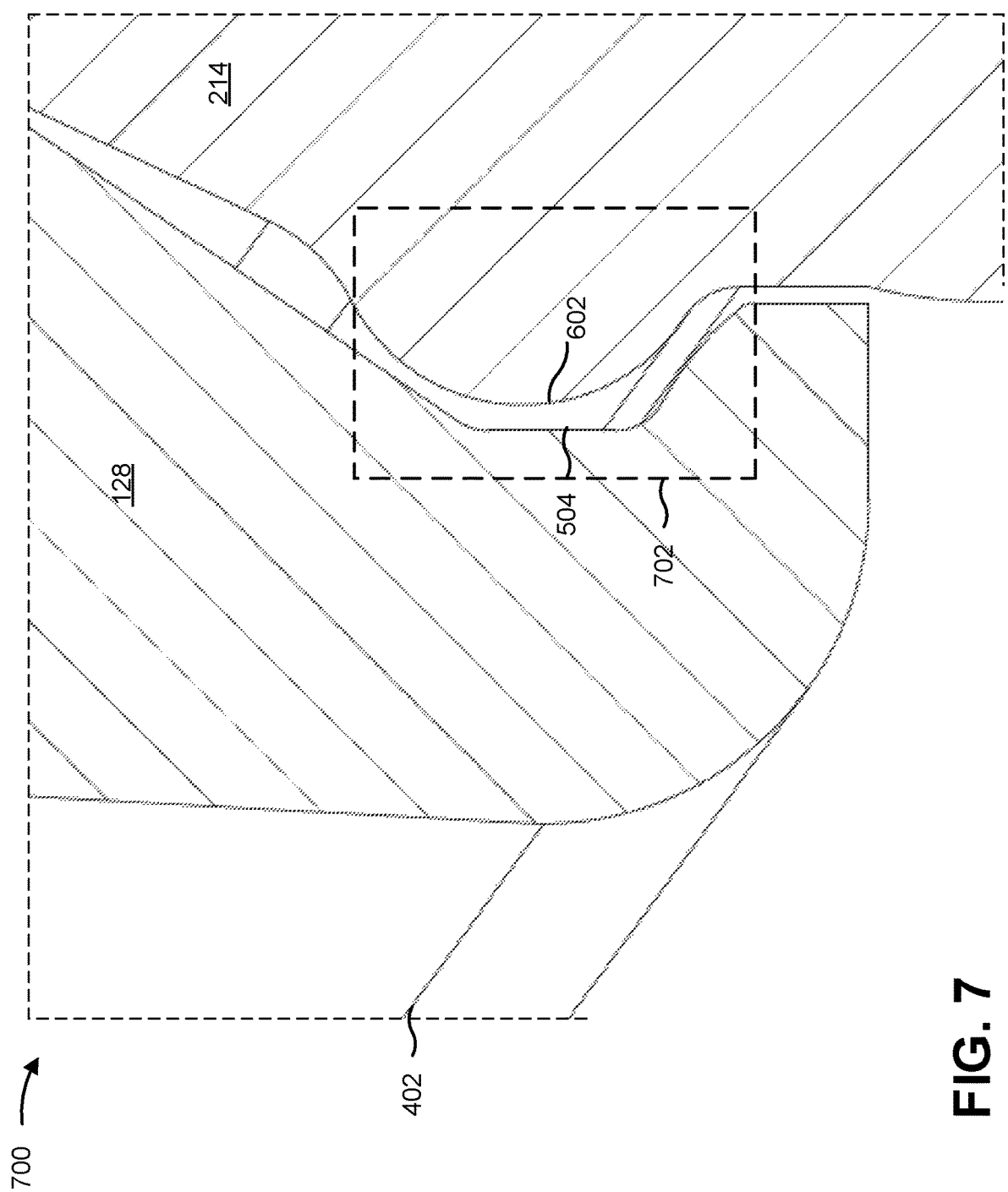
FIG. 7 is a diagram of an example track shoe cover and crawler shoe of the machine of FIG. 1.

FIG. 7 is a diagram 700 of an example track shoe cover and crawler shoe of the machine of FIG. 1. For example, FIG. 7 shows a configuration of track shoe cover 128 and track shoe cover engaging structure 214 of crawler shoe 112 when track shoe cover 128 and track shoe cover engaging structure 214 are mechanically connected to each other.

As shown by reference number 702, when track shoe cover 128 and track shoe cover engaging structure 214 are mechanically connected to each other, attachment ridge 602 of track shoe cover engaging structure 214 and attachment groove 504 may be mechanically connected to each other. For example, attachment ridge 602 may be aligned within attachment groove 504. In some implementations, track shoe cover 128 and track shoe cover engaging structure 214 may be mechanically connected to each other in this manner based on track shoe cover 128 and track shoe cover engaging structure 214 being aligned with each other and/or mechanical pressure being applied to track shoe cover 128 and/or crawler shoe 112 (e.g., to roller engaging surface 202 of track shoe cover 128 and to ground engaging surface 212 of crawler shoe 112). For example, the mechanical pressure may cause side walls 402 to flex around the set of attachment ridges 602 such that the set of attachment grooves 504 and the set of attachment ridges 602 mechanically connect with each other. Additionally, or alternatively, track shoe cover 128 and track shoe cover engaging structure 214 may be mechanically connected in this manner based on a treatment (e.g., a heat treatment, a cold treatment, and/or the like) applied to track shoe cover 128 and/or to track shoe cover engaging structure 214.

As indicated above, FIG. 7 is provided as an example. Other examples are possible and may differ from what was described with regard to FIG. 7.

INDUSTRIAL APPLICABILITY

Track shoe cover 128 may be used with any machine that includes crawler shoe 112, such as machine 102. By including a track shoe cover 128 that can be attached to crawler shoe 112 in the manner described herein, crawler shoe 112 and track shoe cover 128 can be manufactured from different materials. For example, track shoe cover 128 can be manufactured from a material that has increased wear resistant characteristics without needing to manufacture crawler shoe 112 from the same material. This facilitates use of cheaper and/or softer materials for crawler shoe 112 than would normally be used to manufacture crawler shoe 112, thereby conserving costs associated with manufacturing crawler shoe 112. In addition, this simplifies a manufacturing of crawler shoe 112 by reducing or eliminating a need to treat crawler shoe 112 in a previously needed manner (e.g., using inductive heating), thereby reducing manufacturing time and/or costs related to crawler shoe 112.

Further, using track shoe cover 128 in the manner described herein facilitates contact between various rollers of machine 102 and roller engaging surface 202 or track shoe cover 128, rather than crawler shoe 112. This reduces or eliminates wear on crawler shoe 112, thereby increasing an amount of time that crawler shoe 112 can be used without being repaired and/or replaced, which additionally conserves costs related to repairing and/or replacing crawler shoe 112.

Further, the manner in which crawler shoe 112 and track shoe cover 128 can be mechanically connected to each other reduces or eliminates a need for crawler shoe 112 and track shoe cover 128 to be welded to each other, to be fastened to each other, and/or the like. This conserves costs that would otherwise be incurred mechanically connecting crawler shoe 112 and track shoe cover 128 to each other. In addition, this increases an efficiency of mechanically connecting crawler shoe 112 and track shoe cover 128 by reducing or eliminating a need to perform these types of steps. Further, this reduces or eliminates a need for crawler shoe 112 and/or track shoe cover 128 to be treated prior to mechanical connection with each other, thereby conserving costs and/or time associated with mechanically connecting crawler shoe 112 and track shoe cover 128.

Although crawler shoes 112 shown in the figures may include dual roller paths, the implementations described herein apply equally to crawler shoe 112 that includes a single roller path, three roller paths, etc. In addition, although crawler shoe 112 is described as comprising a material that is softer than track shoe cover 128, in some implementations, crawler shoe 112 and track shoe cover 128 may have the same hardness, crawler shoe 112 may have a higher hardness than track shoe cover 128, and/or the like.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A track shoe cover, comprising:
   a roller engaging surface; and
   a shoe engaging surface, comprising:
      a shoe engaging recess defined on at least two opposite sides by a set of side walls, and
      a respective attachment groove included in the set of side walls,
         wherein the respective attachment groove is configured to facilitate mechanical connection of the track shoe cover and a crawler shoe.

2. The track shoe cover of claim 1, wherein the track shoe cover is formed from a material that is harder than a material from which the crawler shoe is formed.

3. The track shoe cover of claim 1, wherein the respective attachment groove is configured to mechanically connect with a respective attachment ridge associated with the crawler shoe.

4. The track shoe cover of claim 1, wherein the track shoe cover and the crawler shoe comprise different materials.

5. The track shoe cover of claim 1, wherein a shape of the track shoe cover matches a shape of a track shoe cover engaging structure associated with the crawler shoe.

6. The track shoe cover of claim 1, wherein the respective attachment groove is a longitudinal attachment groove or a lateral attachment groove.

7. The track shoe cover of claim 1, wherein the respective attachment groove is cast or machined during production of the track shoe cover.

8. A crawler shoe, comprising:
   a track shoe cover engaging structure on an upper surface of the crawler shoe,
      wherein the track shoe cover engaging structure is configured to mechanically connect with a shoe engaging recess of a track shoe cover,
      wherein the track shoe cover engaging structure comprises:
         a respective attachment ridge on at least one pair of opposite sides of the track shoe cover engaging structure,
            wherein the respective attachment ridge is configured to facilitate mechanical connection of the crawler shoe and the track shoe cover.

9. The crawler shoe of claim 8, wherein the crawler shoe is included in a crawler track included in a machine.

10. The crawler shoe of claim 8, wherein the crawler shoe and the track shoe cover have different wear characteristics.

11. The crawler shoe of claim 8, wherein the respective attachment ridge and a respective attachment groove associated with the track shoe cover are configured to mechanically connect with each other.

12. The crawler shoe of claim 8, wherein a shape of the track shoe cover engaging structure and a shape of the shoe engaging recess associated with the track shoe cover match each other.

13. The crawler shoe of claim 8, wherein the respective attachment ridge is a longitudinal attachment ridge or a lateral attachment ridge.

14. The crawler shoe of claim 8, wherein a set of attachment grooves of the track shoe cover are configured to mechanically connect with the crawler shoe.

15. A system, comprising:
   a track shoe cover, comprising:
      a shoe engaging recess configured to mechanically connect with a track shoe cover engaging structure of a crawler shoe; and
   the crawler shoe, comprising:
      the track shoe cover engaging structure configured to mechanically connect with the shoe engaging recess,
         wherein a set of attachment grooves and a set of attachment ridges are configured to mechanically connect with each other to mechanically connect the track shoe cover and the crawler shoe.

16. The system of claim 15, wherein the system is included in a crawler track.

17. The system of claim 16, wherein the crawler track is included in a machine.

18. The system of claim 15, wherein the track shoe cover and the crawler shoe have different wear characteristics.

19. The system of claim 15, wherein the track shoe cover prevents the crawler shoe from contacting a roller of a machine when the system is installed in a crawler track on the machine.

20. The system of claim 15, wherein:
   the set of attachment grooves extend on at least two opposite sides of the shoe engaging recess, and
   the set of attachment ridges extend on at least two opposite sides of the track shoe cover engaging structure,
      wherein the at least two opposite sides of the shoe engaging recess and the at least two opposite sides of the track shoe cover engaging structure match.

* * * * *